United States Patent [19]

Looi et al.

[11] Patent Number: 5,545,446

[45] Date of Patent: Aug. 13, 1996

[54] BATH OR SHOWER PANEL

[76] Inventors: Hon Y. Looi; Phuay E. Teo, both of Block 5403, Ang Mo Kio Ind Park 2, Singapore, Singapore

[21] Appl. No.: 264,318

[22] Filed: Jun. 23, 1994

Related U.S. Application Data

[63] Continuation-in-part of Ser. No. 427,232, Oct. 24, 1989, Pat. No. 5,336,354.

[51] Int. Cl.$^6$ .................................................. B32B 31/00
[52] U.S. Cl. ................... 428/13; 4/609; 4/614; 52/787.11; 428/46; 428/203
[58] Field of Search ................ 428/13, 46, 203; 52/787.11; 4/607, 609, 614

[56] References Cited

U.S. PATENT DOCUMENTS

| | | | |
|---|---|---|---|
| 1,947,516 | 2/1934 | Broadman | 428/203 |
| 2,980,574 | 4/1961 | Menzer | 428/203 |
| 3,198,686 | 8/1965 | Caligari, Jr. | 428/203 X |
| 4,219,598 | 8/1980 | Noma et al. | 428/203 X |
| 5,336,354 | 8/1994 | Looi et al. | 428/203 X |

FOREIGN PATENT DOCUMENTS

| | | |
|---|---|---|
| 890304 | 2/1962 | United Kingdom . |
| 988433 | 4/1965 | United Kingdom . |
| 1131718 | 10/1968 | United Kingdom . |

*Primary Examiner*—Henry F. Epstein
*Attorney, Agent, or Firm*—Merchant, Gould, Smith, Edell, Welter & Schmidt, P.A.

[57] ABSTRACT

A transparent or translucent bath or shower panel includes a laminate of two layers of resin-impregnated fiberglass which are transparent or translucent, and a non-woven tissue arranged between the fiberglass layers and provided with any desired decorative pattern which can be viewed through either one of the fiberglass layers, and yet which is protected from contact with water and water vapor by the fiberglass layers.

9 Claims, 1 Drawing Sheet

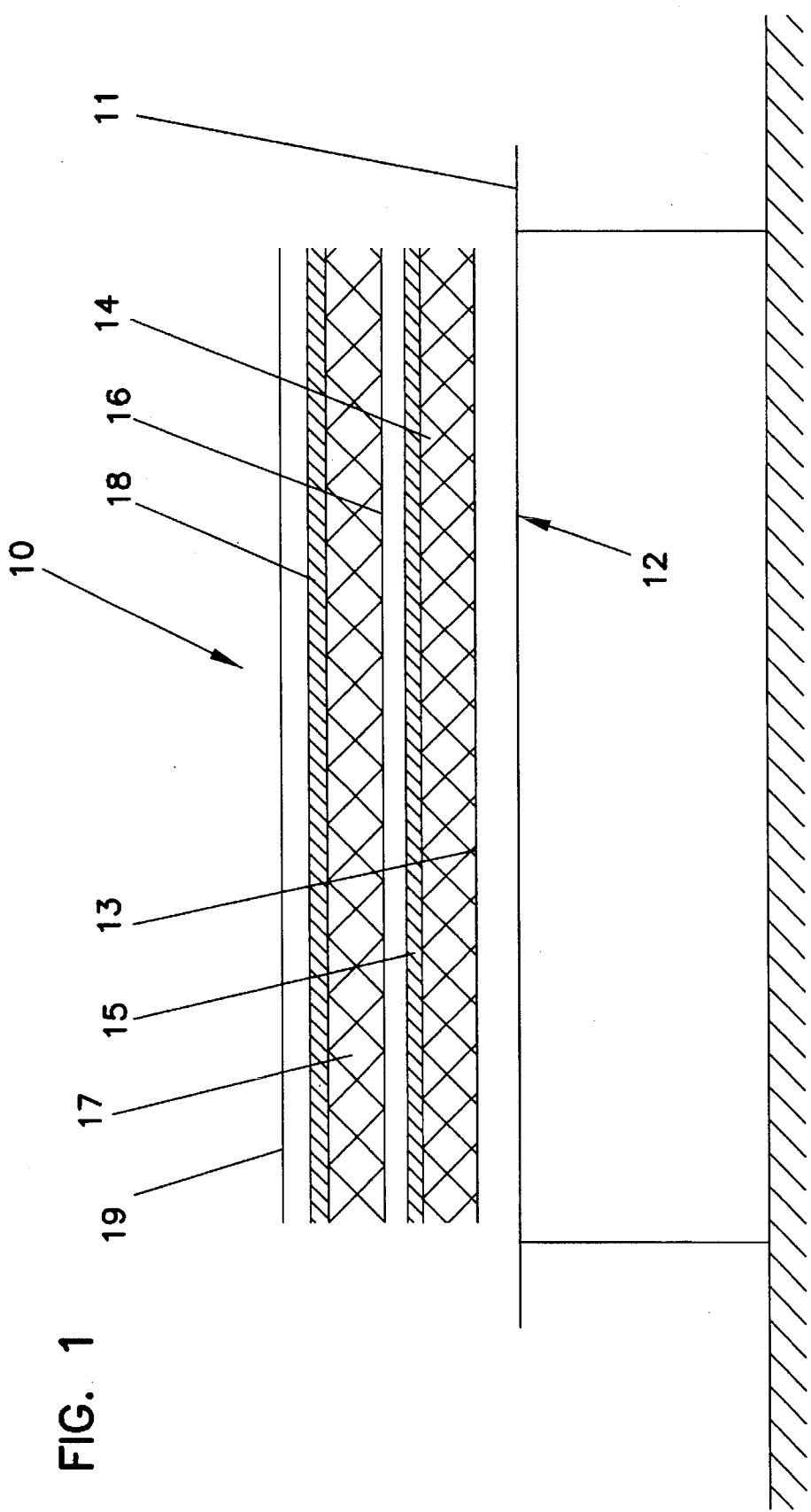

BATH OR SHOWER PANEL

This is a continuation-in-part of application Ser. No. 07/42732, filed Oct. 4, 1989 now U.S. Pat. No. 5,336,354.

BACKGROUND OF THE INVENTION

This invention relates to a panel for mounting along one or more edges of a bath or a shower tray, so as to form at least part of an enclosure for retaining water splashes generated in use of a bath or shower.

It is well known to use plastics sheets to form shower cabinets, one or more of such sheets forming access doors which are mounted for slidable movement along guide tracks between open and closed positions. Usually, these sheets are opaque, or translucent, and are often formed from a moulded sheet of clear plastics material, possibly incorporating a textured surface finish for decorative purposes, or to render the sheet non-transparent. However, if a decorative pattern should be required, this could only be provided by subsequent application of decorative cladding material, eg in the form of "transfers" to the already moulded sheets, and this involves an additional manufacturing process, and also has the risk that the decorative cladding will deteriorate in service and eventually peel off.

It is also known to mould plastics sheets to form "bath panels" which shield the bath sides from view, such sheets being moulded in a single colour to suit the colour of a particular bath.

Accordingly, to date there has not been made available generally a technique whereby generally transparent or translucent panels can be produced readily on a mass production basis, and into which can be incorporated, during the manufacturing proceed, any selected decorative material.

SUMMARY OF THE INVENTION

According to the present invention there is provided a transparent or translucent panel for mounting along one or more edges of a bath or shower tray so as to form an at least partial enclosure for retaining water splashes generated in use of a bath or shower, in which the panel comprises a laminate of two layers of resin-impregnated fibreglass which are transparent or translucent, and a non-woven tissue arranged between said layers.

Preferably, a colour pigment may be added into the resin before impregnation into one or both of the fibreglass layers.

The pigment may be any desired colour, and may be added to the resin used to impregnate either one or both of the fibreglass layers.

A different colour of pigment may be used to colour the resin for each layer.

The tissue may be provided with any desired decorative pattern, which is thereby imparted to the entire panel and which can be viewed from either side of the panel through a corresponding one of the two fibreglass layers.

By virtue of the incorporation of the decorative material within the body of the panel during its manufacture, the decorative material is excluded from contact with water and water vapour, and therefore the visual presentation of the decorative material is not affected adversely in service.

The required pattern or decorative material may conveniently be formed on the tissue by silk screen printing, which enables accurate designs to be applied on a mass production basis, and which designs are entirely shielded from the damaging environment in which the panels will be used, namely the repeated cycle of exposure to water and vapour and subsequent air drying.

To provide a smooth external finish to the panel, it is preferred that a surface film is applied to the exposed face of each fibreglass layer.

Advantageously, the surface film which is applied to the exposed face of each fibreglass layer comprises first and second transparent plastics films. The presence of the plastics films promotes ready shedding of water impinging on the surface of the panel.

BRIEF DESCRIPTION OF THE DRAWINGS

FIG. 1 is a cross-sectional view of a panel in accordance with the principles of the present invention.

DETAILED DESCRIPTION OF THE PREFERRED EMBODIMENT

A transparent or translucent panel according to the invention, will now be described in detail with reference to the accompanying schematic drawing.

Referring now to the drawing, there will now be described a transparent or translucent panel for mounting along one or more edges of a bath or shower tray so as to form an at least partial enclosure for retaining water splashes generated in use of a bath or shower, and a method of manufacturing such a panel. The panel is designated generally by reference 10 and comprises a series of successive layers which are applied in turn to a support surface 11 formed by a flat horizontal table 12 having dimensions of at least 1.5 meter by 3 meter.

The laminate includes essentially two layers of resin-impregnated fibreglass which are transparent or translucent, and a non-woven tissue arrangement between these layers. However, in addition, it is preferred that a smooth surface finish is provided for the exposed faces of the resin impregnated layers, by applying transparent plastics films.

Thus, as shown in the drawing, a first transparent plastics film 13 is laid on the table 12, and takes the form of a polyethylene terephthalate film 16 microns thick. The table 12 is provided with a glass top, and the film 13 is smoothed onto the table top by a scraper tool.

Onto the exposed face of the film 13 there is applied a first layer of chopped fibreglass mat 14 of 300 grams size. A resin 15 is then applied to the exposed face of the fibreglass mat 14, and this impregnates the fibreglass mat. The resin 15 comprises a mixture of saturated polyester resin (weighing 2.8 kilograms) and 50 grams methyl ethyl ketone peroxide. A nylon roller is then applied to the layer structure thus formed by film 13, fibreglass layer 14 and resin 15 so as to flatten these components. A further brush roller may then be used which is applied to the structure thus formed, to ensure that any air bubbles present in the structure are expelled.

A sheet of non-woven tissue 16 is then applied, to which any required decorative material has been pre-applied by a silk screen process. The non-woven tissue preferably comprises a non-woven tissue of the type available under the trade mark EDEROL-FILTER NON-WOVEN. The process of flattening and smoothing is then repeated.

Thereafter, a second layer of chopped fibreglass mat 17 is applied, and resin 18 is applied, similarly to resin 15, and finally a second transparent plastics film 19 is applied. It should be noted that, after each layer of either resin, or sheet material (chopped mat, the non-woven tissue or the films) is laid, it is smoothed. Also, a light film of water is sprayed over the second film 19, so that the scraper can move smoothly over the composite structure.

A colour pigment may be added to one or both of the resins 15, 18 to give the panel 10 a desired colour. A pigment may be added either to resin 15 or to resin 18 or to both. In addition, if a colour pigment is added to both resins 15 and 18, a different colour may be added to each resin.

Prior to setting or curing of the composite structure, the structure is stretched over the surface of the table 12, and is then retained by clips. The composite structure then cures or sets naturally in about 2 hours, though alternative resin components may be used, in which some other means than air drying is used to cause the composite structure to cure or set. After about 2 to 3 hours, the composite structure has dried, and forms a rigid laminate approximately 2 mm thick, which can then be used to form a shower enclosure following mounting on the edges of a shower tray, or an enclosure along the upper edge of a bath.

Therefore, the method described above provides a transparent or translucent panel in the form of a laminate composed of two layers of resin impregnated fibreglass which are transparent or translucent, and with a non-woven tissue arranged between these layers and which is provided with any required decorative material for the panel. By incorporating the decorative material within the body of the laminate, it is shielded from exposure to any agents which otherwise would be liable to cause deterioration in the appearance of the decorative material.

We claim:

1. A transparent or translucent panel for mounting along at least one edge of a bath or shower tray which forms an at least partial enclosure for retaining water splashes generated in use of a bath or shower, comprising:

a laminate of first and second layers of resin-impregnated fiberglass which are transparent or translucent;

the first layer of resin-impregnated fiberglass including a first transparent plastics film layer, a first fiberglass layer on the first transparent plastics film layer, and a first resin layer on the first fiberglass layer;

the second layer of resin-impregnated fiberglass including a second transparent plastics film layer, a second fiberglass layer on the second transparent plastics film layer, and a second resin layer on the second fiberglass layer; and a non-woven tissue arranged between said first and second resin-impregnated fiberglass layers, wherein said laminate protects said tissue from deterioration caused by water splashes.

2. A panel according to claim 1, wherein the tissue is provided with a decorative pattern, the tissue being viewed from either side of the panel through a corresponding one of the first and second layers of resin-impregnated fiberglass.

3. A panel according to claim 2, wherein the decorative pattern is applied to the tissue by silk screen printing.

4. A panel according to claim 2, wherein a surface film is applied to an exposed face of each of the first and second layers of resin-impregnated fiberglass, to provide a smooth external finish to the panel.

5. A panel according to claim 3, wherein a surface film is applied to an exposed face of each of the first and second layers of resin-impregnated fiberglass, to provide a smooth external finish to the panel.

6. A panel according to claim 1, wherein a surface film is applied to an exposed face of each of the first and second layers of resin-impregnated fiberglass, to provide a smooth external finish to the panel.

7. A panel according to claim 1, wherein one of the first and second resin layers includes a color pigment.

8. A panel according to claim 1, wherein each of the first and second resin layers includes a color pigment.

9. A panel according to claim 8, wherein the first and second resin layers includes different color pigments.

* * * * *

UNITED STATES PATENT AND TRADEMARK OFFICE
CERTIFICATE OF CORRECTION

PATENT NO. : 5,545,446

DATED : August 13, 1996

INVENTOR(S) : Looi et al.

It is certified that error appears in the above-indentified patent and that said Letters Patent is hereby corrected as shown below:

On the title page: Item: in [76], line 2, "5403" should read --5043--.

In column 1, line 4, "07/427,32" should read --07/427,232--.

Signed and Sealed this

Twenty-seventh Day of May, 1997

Attest:

BRUCE LEHMAN

Attesting Officer

Commissioner of Patents and Trademarks